Fig. 4.

Patented May 1, 1934

1,957,246

UNITED STATES PATENT OFFICE 1,957,246

METHOD OF AND APPARATUS FOR MOLDING

Erle J. Byerlein, Wauwatosa, Wis.

Application July 27, 1932, Serial No. 624,949

33 Claims. (Cl. 22—32)

The present invention relates generally to improvements in the art of founding, and relates more specifically to an improved process of and apparatus for manufacturing molds especially adapted for foundry service.

Generally stated, an object of the invention is to provide an improved method of manufacturing molds of the class wherein the sand is packed against a pattern which is supported from beneath, and in which the pattern is subsequently withdrawn from above the mold, while inverted.

Another general object of the invention is to provide an improved molding machine which is simple and compact in construction, and which is especially adapted for the effective exploitation of the improved method.

In the manufacture of certain classes of molds, it is desirable to invert the mold after the sand has been applied to the pattern and before stripping is effected. While a number of machines, known to the trade as roll-over machines, intended for this class of service, have heretofore been manufactured and placed upon the market, these prior roll-over machines are not entirely satisfactory for numerous reasons. All of the prior machines of this type are too complicated and bulky, and they also introduce a great many unnecessary operations and thus prevent formation of the molds at a sufficiently high rate of speed. The molds produced by these prior roll-over machines are frequently defective either because of the omission of a squeezing operation, or because this operation when used is introduced at the wrong time, or because the flask and pattern are not rigidly held during the packing operations and are not properly guided during relative movement thereof. These and other defects in the construction and operation of the prior machines of the roll-over type, have made them quite unsatisfactory for the class of work for which they are intended.

A more specific object of the present invention is to provide an improved process of producing molds of the class which it is desirable to produce in a roll-over type of machine.

Another specific object of the present invention is to provide a roll-over type of molding machine which obviates all of the objectionable features of the prior machines of this type.

A further specific object of the invention is to provide a molding machine of the roll-over type which is capable of quickly and automatically producing a succession of perfect molds.

Still another specific object of the invention is to provide a molding machine wherein jolting and squeezing are accomplished before the molds are completely inverted preparatory to removal of the patterns therefrom, thus producing perfect molds and reducing the number of operations to a minimum.

Another specific object of the invention is to provide a molding machine in which the sand is squeezed prior to or during inversion or rolling-over of the molds, and which is therefore operable with minimum power.

A further specific object of the invention is to provide a molding machine wherein the flasks, patterns and sand may be conveniently applied preparatory to forming the molds, and from which the completed molds may be quickly and readily removed.

Still another specific object of the invention is to provide a rigid and durable molding machine structure wherein the flasks and patterns are positively locked in position, or are definitely guided, during the various operations, so as to insure production of only perfect molds.

Another specific object of the invention is to provide a roll-over molding machine wherein clamping of the pattern or pattern support to the flask with the aid of special clamps, is eliminated.

A further specific object of the invention is to provide simple and highly efficient mechanism for facilitating the removal of completed molds from a molding machine or the like.

Still another specific object of the invention is to provide simple and effective means for removing drop sand, and for preventing such excess sand from interfering with the normal operation of a molding machine or the like.

Another specific object of the invention is to provide a roll-over type of machine for manufacturing molds, wherein all parts are located above the floor level and are freely accessible for operation, inspection, and repairs.

A further specific object of the invention is to provide a molding machine which is conveniently operable and which may be manufactured, installed and operated at minimum cost.

These and other objects and advantages and the mode of attaining the same, will be clearly apparent from the following detailed description.

A clear conception of the several steps constituting the improved method, and of one form of machine for carrying out the commercial exploitation thereof, may be had by referring to the drawings accompanying and forming a part of this specification, in which like reference characters designate the same or similar parts in the various views.

The improved molding machine constituting the present invention, comprises in general an assemblage of elements and mechanisms whereby the following cycle of operations is automatically performed with the aid of manually operable control devices and fluid pressure actuated power devices. The pattern and flask are initially loosely supported upon a movable carrier during the delivery of sand to the mold forming elements, and are capable of being jarred or jolted during the introduction of sand thereto. After the sand has been introduced and the jolting operation has been completed, the pattern support is automatically locked to the carrier and the latter is tilted, whereupon sand is squeezed into intimate contact with the flask and pattern so as to complete the mold while in tilted position. The completed mold is then fully inverted so as to position the pattern at the top, and after this inversion has been effected, the pattern is vibrated and drawn away from the mold preparatory to removal of the latter from the machine. When the completed mold has been removed, the elements are quickly and automatically restored to the initial sand receiving and jolting position preparatory to repetition of the cycle and formation of a subsequent mold. It should be understood that various forms or types of flasks and patterns may be utilized, and that different sizes of molds may be produced with the same speed, accuracy and general convenience.

Figure 1:
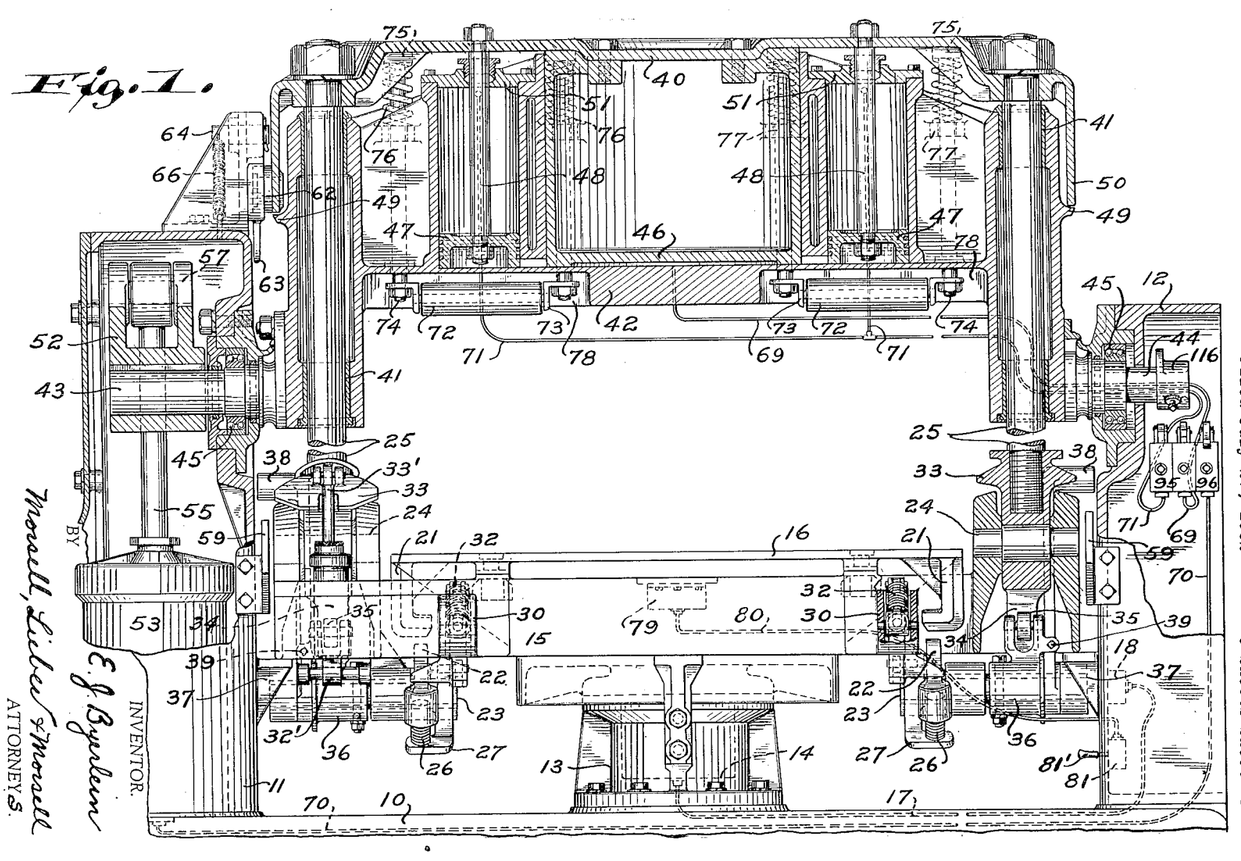
Fig. 1 is a part sectional front view of one of the improved roll-over molding machines, the section being taken at an inclination to the plane of the view, and having been thrown into said plane in order to simplify the disclosure.
Figure 2:
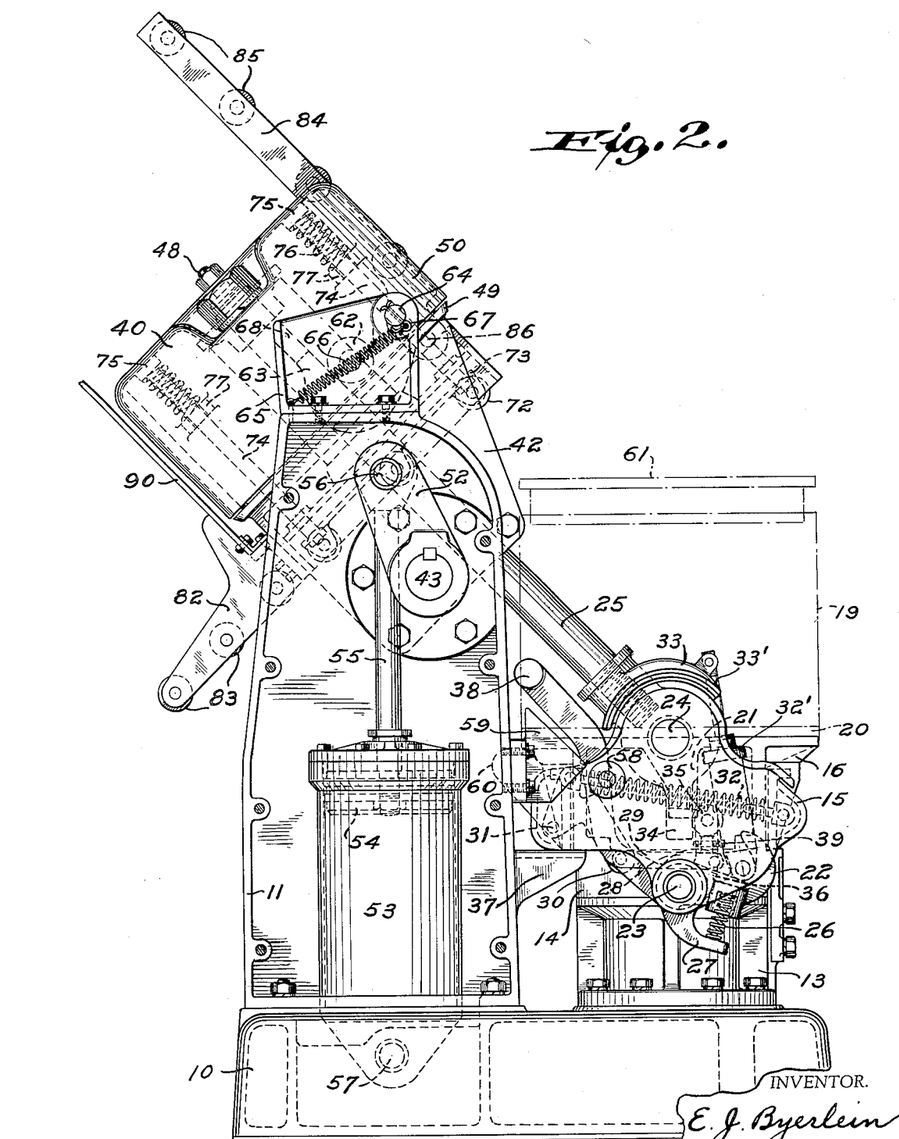
Fig. 2 is an end view of the molding machine showing the parts thereof positioned for the initial delivery of sand to the flask and pattern, with the pattern support released from its normal carrier and resting directly upon the jolting mechanism.

Referring specifically to Figs. 1 to 5 inclusive of the drawings, the improved molding machine illustrated therein consists generally of a bed plate 10 having laterally spaced end frames 11, 12 rigidly attached thereto, and also having a jolt cylinder 13 mounted thereon midway between the end frames 11, 12. It is to be observed that the jolting cylinder 13 is offset with respect to the end frames 11, 12 so as to avoid obstruction or interference with the initial delivery of sand to a flask and pattern resting upon the jolting mechanism. Within the cylinder 13 is located a vertically reciprocable jolting piston 14 the upper extremity of which is enlarged for direct cooperation with a pattern support or table 16 associated with a cross beam or cradle 15 as shown in Fig. 1. The pattern supporting table 16 is capable of being locked to the cradle 15 but when the cradle is positioned as shown in Figs. 1 and 2, the lock is released so as to permit free vertical sliding of the table 16 relative to the cradle 15 and jolting of the table by the piston 14, without affecting the cradle 15 and its supporting structure. The jolting piston 14 is operable in a well-known manner by admitting compressed air or other actuating fluid to the cylinder 13 through a pipe line 17 in order to elevate the piston, and by suddenly releasing the actuating fluid when the piston 14 has reached a predetermined height in order to permit the elevated parts to drop by gravity and thus jar the sand against the pattern. This action is repeated in rapid succession with the aid of a jolting control valve 18, and effectively jolts the pattern table and the elements supported thereon.

Figure 3:
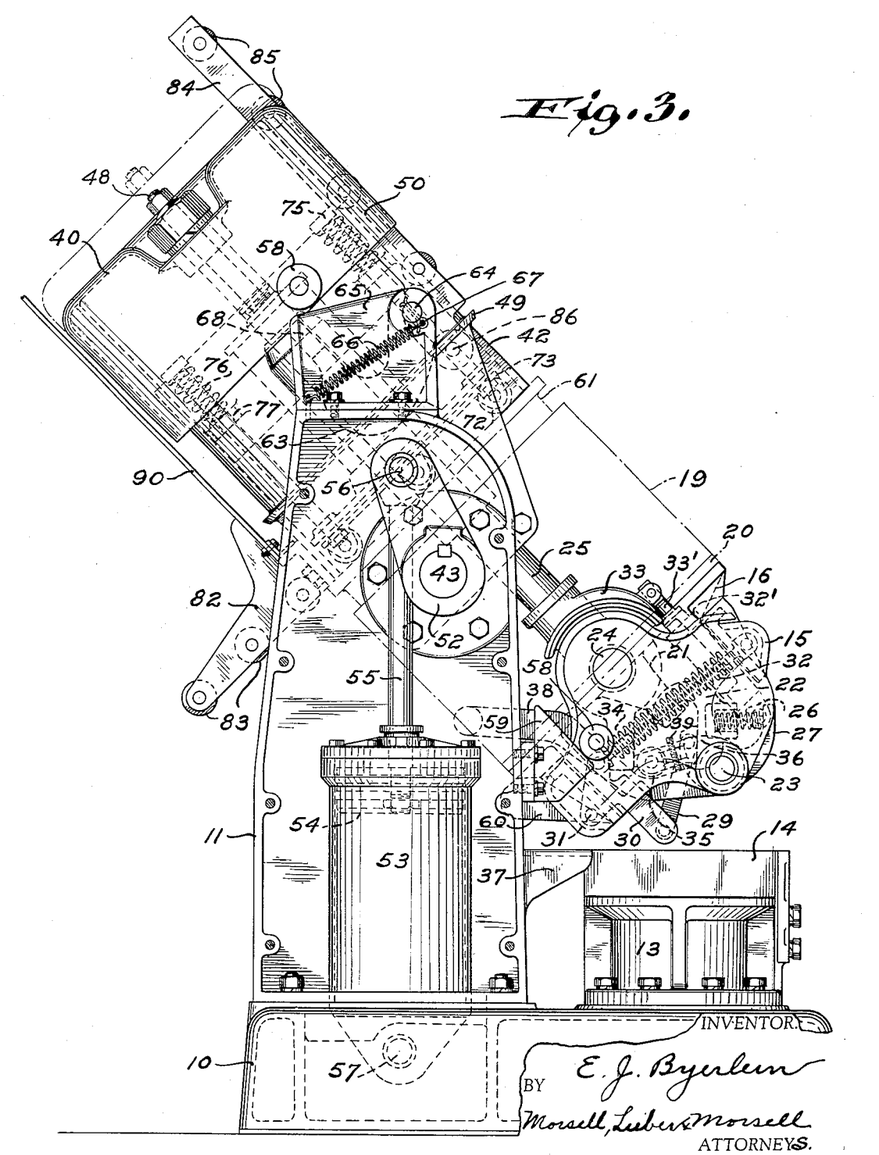
Fig. 3 is an end view of the molding machine showing the sand filled flask and pattern tilted and the sand squeezing operation being performed.

While the pattern table 16 is thus free to be jolted without affecting the cradle 15, it must be locked to the cradle 15 before tilting of the cradle is effected. The mechanism for thus locking the pattern supporting table 16 to the cradle 15 after the sand has been jolted within a flask 19 and around a pattern 20 supported upon and secured to the table 16, comprises a pair of angular end lugs 21 formed integral with and depending from the table 16, and hooks 22 swingably supported upon stub shafts 23 journaled in the ends of the cradle 15. As illustrated in Figs. 1 and 2, the locking hooks 22 are out of engagement with the lugs 21 so as to permit jolting operation, but these hooks 22 automatically become effective to lock the table 16 to the cradle 15 as shown in Fig. 3, when the cradle is tilted upon its suspension pivots 24 and relative to the end rods 25. The hooks 22 are swingable upon the shafts 23 which are pivotally associated with the cradle 15, and the hooks coact with compression springs 26 which react against levers 27 rigidly mounted upon the shafts 23. These springs 26 merely provide lost motion connections between the hooks 22 and the levers 27, and serve to prevent excessive stressing of the elements when interlocked. The shafts 23 are oscillatable relative to the cradle 15 by means of lever arms 28, links 29 and levers 30, the latter of which are supported upon pivots 31 and coact with tension springs 32. The tension springs 32 tend to swing the hooks 22 away from the lugs 21 at all times, and the tension of these springs 32 is adjustable in any convenient manner. The ends of the springs 32 remote from the levers 30, are attached directly to the cradle 15 as shown in Figs. 2 and 3.

As previously indicated, the cradle 15 is suspended from pivots 24 carried by the parallel rods 25, and the pivots 24 coact directly with heads 33 secured to the ends of the rods 24 and having integral projections 34. The head projections 34 are cooperable with rollers 35 and with the extreme swinging ends of crank arms 31 which carry the rollers 35. The crank arms 36 are rigidly attached to the pivot shafts 23, and when the cradle 15 is positioned as shown in Figs. 1 and 2, the projections 34 coact with the rollers 35 but do not directly engage the arms 36. When thus positioned, the rollers 35 and crank arms 36 hold the hooks 22 out of engagement with the lugs 21 and maintain the springs 32 in stretched condition. When the cradle 15 is tilted to the position shown in Fig. 3, the projections 34 by virtue of their displacement relative to the cradle 15, permit the springs 32 to become effective to swing the rollers 35 and arms 36 to the position shown in said figure, wherein the hooks 22 interlock with the lugs 21 and positively lock the pattern table 16 to the cradle 15. It is to be noted that with the elements thus positioned, the extreme ends of the crank arms 36 directly engage the projections 34 and that the rollers 35 are released from engagement with the projections 34, thus preventing the hooks 22 from being withdrawn from the lugs 21 until the rollers 35 are again brought into direct engagement with the projections 34. It is also to be observed that with the structure in initial sand receiving and jolting position, the cradle 15 rests upon brackets 37 formed integral with the end frames 11, 12, and a pair of hook disengaging levers 38 are attached to the pivot shafts 23 adjacent to the crank arms 36. These levers 38 are adapted to automatically release the surface coaction between the extreme ends of the crank arms 36 and the projections 34 and to bring the rollers 35 into direct coaction with the projections 34, when the cradle 15 is being restored from tilted to horizontal position. Set screws 39 carried by the release arms 36 are adjustable to insure proper operation of the levers 38, and the mechanism for actuating the levers 38 will be subsequently described more in detail, in connection with the description of the roll-back mechanism which restores the cradle to initial sand receiving position.

The locking mechanism for the pattern table 16 is made effective simultaneously with the tilting of the cradle 15 and preceding the squeezing operation so that the cradle tilting mechanism will next be described. In view of the fact that the cradle tilting mechanism is so intimately related to the sand squeezing and mold inverting mechanism, all of these mechanisms must necessarily enter into the common description. As previously indicated, corresponding ends of the parallel rods 25 carry the heads 33 which support the cradle 15, and the opposite corresponding ends of the rods 25 are rigidly attached to a cross head 40. The medial portions of the rods 25 are slidable in guide bearings 41 formed in a revolvable member 42, and the member 42 has end supporting pivots 43, 44, supported in anti-friction bearings 45 mounted in the end frames 11, 12 respectively. The squeeze plunger 46 of relatively large diameter, is secured to the cross head 40 midway between the rods 25, and coacts with a central bore in the member 42. Draw pistons 47 of smaller diameter than that of the plunger 46, are secured to the cross head 40 on opposite sides of the plunger 46, by means of piston rods 48, and coact with parallel bores in the member 42. The limit of travel or sliding of the rods 25 and of the cross head 40 in one direction, is determined by a stop flange 49 formed integral with the member 42 and engageable with a flange 50 formed integral with the cross head 40. The limit of travel or sliding of the rods 25 and cross head 40 in the opposite direction, is defined by cylinder heads 51 which are engageable with the pistons 47 during the sand squeezing operation. The revolvable member 42 is rotatable about the common axis of the pivots 43, 44, by means of a crank 52 secured to the pivot 43, and a piston 54 movable by fluid under pressure within a cylinder 53 and having a rod 55 coacting with a pivot pin 56 carried by the swinging end of the crank 52. The cylinder 53 is pivotally supported upon the base plate 10 by means of a pin 57, and both the crank 52 and cylinder 53 may be totally housed within the end frame 11. The plunger 46, pistons 47 and piston 54 may all be actuated by fluid under pressure such as compressed air, and the mechanism for controlling the delivery of actuating fluid to and from the displacement chambers of these plungers and pistons, will be subsequently more fully described.

It is important following the initial introduction of sand and the jolting operation, to swing the cradle 15 so that the flask 19 and pattern 20 will be in alinement with the rods 25, before the squeezing operation is effected. In order to definitely fixt the angle of tilt of the cradle 15 preparatory to the sand squeezing operation, and to assist in the tilting operation, the cradle 15 is provided at its opposite ends with alined rollers 58 which cooperate with guide brackets 59 secured to the end frames 11, 12 near the supporting brackets 37. The cradle 15 is also provided with integral flanges 60 having inclined surfaces adapted to coact with the upper horizontal surfaces of the brackets 37 during initial tilting of the cradle 15 and before the rollers 58 are moved into engagement with the inclined guide surfaces of the brackets 59. It has been found very desirable in actual practice, to provide a cushioning device comprising a cylinder 32' pivotally attached to the cradle 15 and a rod 33' pivotally attached to one of the heads 33 and secured to a piston 34' movable within the cylinder 32', in order to prevent the parts being tilted, from jolting too severely. The cylinder 32' of this cushioning device is filled with liquid, and the piston 34' loosely fits the cylinder bore and has one or more by-pass valves 35' therein for permitting quick movement in one direction while producing a dash-pot checking in the opposite direction of travel of the piston, see Fig. 10. As previously indicated, the locking of the pattern table 16 to the cradle 15 is automatically effected during this tilting operation and the sand squeezing operation takes place immediately after the cradle has been tilted, with the aid of the rods 25 and of the flanges 60. It should be noted, however, that preparatory to the tilting and squeezing operations, a removable compression plate 61 should be inserted in the upper open end of the flask 19, and this compression plate will naturally be tilted with the flask 19, pattern 20, pattern table 16, and cradle 15.

While the rollers 58 cooperating with the inclined surfaces of the brackets 59 serve to effectively guide the cradle 15 after tilting has been effected and during the sand squeezing operation, it is also desirable to provide guiding and supporting means for the member 42 and cross head 40. For this purpose, the cross head 40 is provided with a roller 62 which is engageable with a hook 63 when the mechanism is positioned as in Figs. 1 and 2 during the jolting operation. This coaction of the roller 62 with the hook 63 maintains the parts in the position illustrated in Fig. 2, even if the fluid pressure should be relieved beneath the piston 54. The hook 63 is mounted upon a pivot pin 64 journaled in an auxiliary frame 65 which is mounted upon the side frame 11, and a tension spring 66 having one end secured to the frame 65 and having its opposite end attached to a cotter pin 67, serves to resiliently urge the hook 63 into the position shown with its nose in contact with a guide 68. The guide 68 is formed integral with the frame 65 and has an inclined guide surface which is parallel to the inclined upper surfaces of the brackets 59 and which is moreover alinable with the inner surface of the hook 63. It will be apparent that when the cross head 40 and the rods 25 with the cradle 15 suspended therefrom, are moved upwardly as during the sand squeezing operation, the roller 62 will travel from the hook 63 onto and over the inclined surface of the guide 68, thereby insuring parallel movement of the cross head 40 and cradle 15. After the roller 62 has proceeded upwardly beyond the end of the guide 68 as shown in Fig. 3, the cross head 40 and member 42 are released for inversion by gravity when the piston 54 is released.

The initial tilting of the cradle 15 and the subsequent squeezing of the sand within the tilted flask 19, is effected by the admission of fluid under pressure to the displacement chamber of the plunger 46 through a pipe 69 shown diagrammatically in Fig. 1. The control of this admission and the subsequent exhaust of the fluid, are accomplished by valve mechanism shown in Figs. 6 to 9 inclusive, which functions to tilt the cradle 15 and to perform the sand squeezing operation and to subsequently release the squeezing pressure when the roll-over or inversion has been effected. The detailed operation of this valve mechanism will be described more fully in connection with the remaining control valve structure. The roll-over or inversion of the member 42, cradle 15 and of the intervening squeezed mold, is effected by the automatic release of fluid pressure from within the lower displacement chamber of the cylinder 53 and piston 54, after the roller 62 has traveled beyond the upper end of the guide 68 as illustrated in Fig. 3. Fluid under pressure is admitted to and released from the cylinder 53 through a pipe 70 shown diagrammatically in Fig. 1, and while the admission of fluid pressure to the roll-over cylinder 53 is controllable by means of a manually operable valve which will be later described, the release of the fluid pressure is effected automatically.

Figure 4:
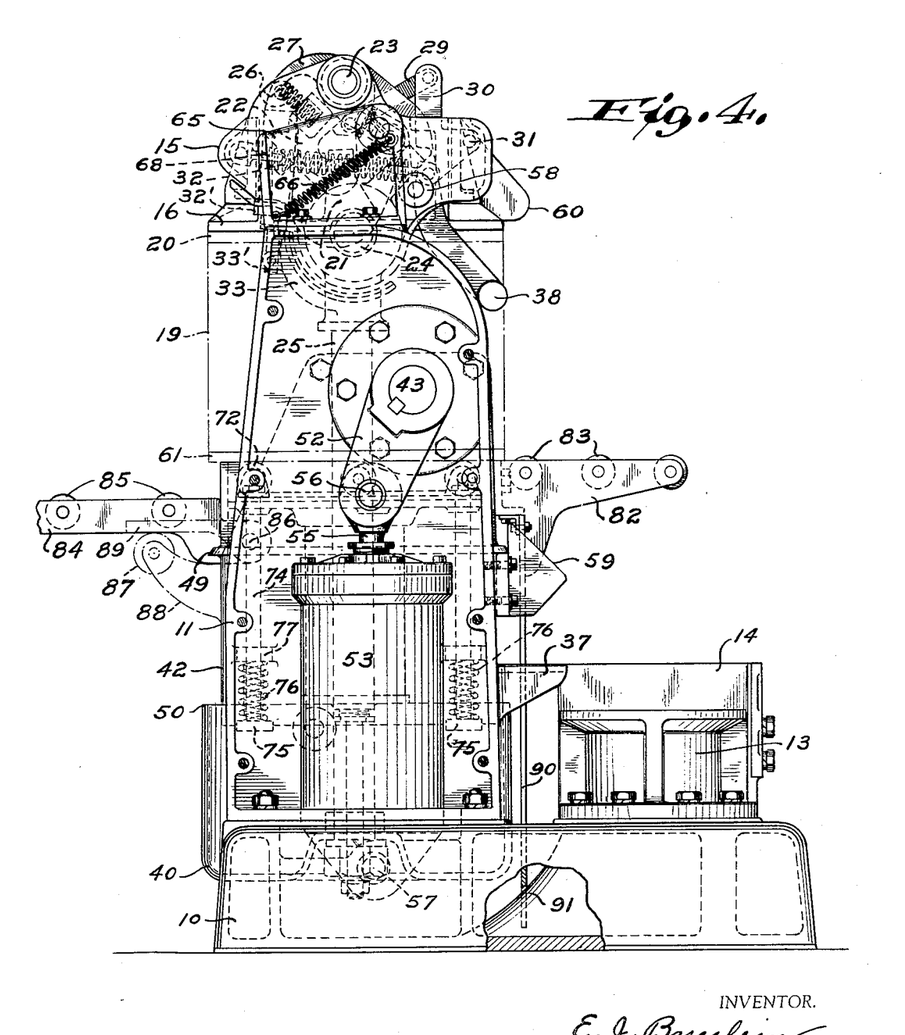
Fig. 4 is an end view of the molding machine showing the flask and pattern with the sand compressed thereagainst, completely inverted and preparatory to final withdrawal of the pattern from the mold.
Figures 5, 10:
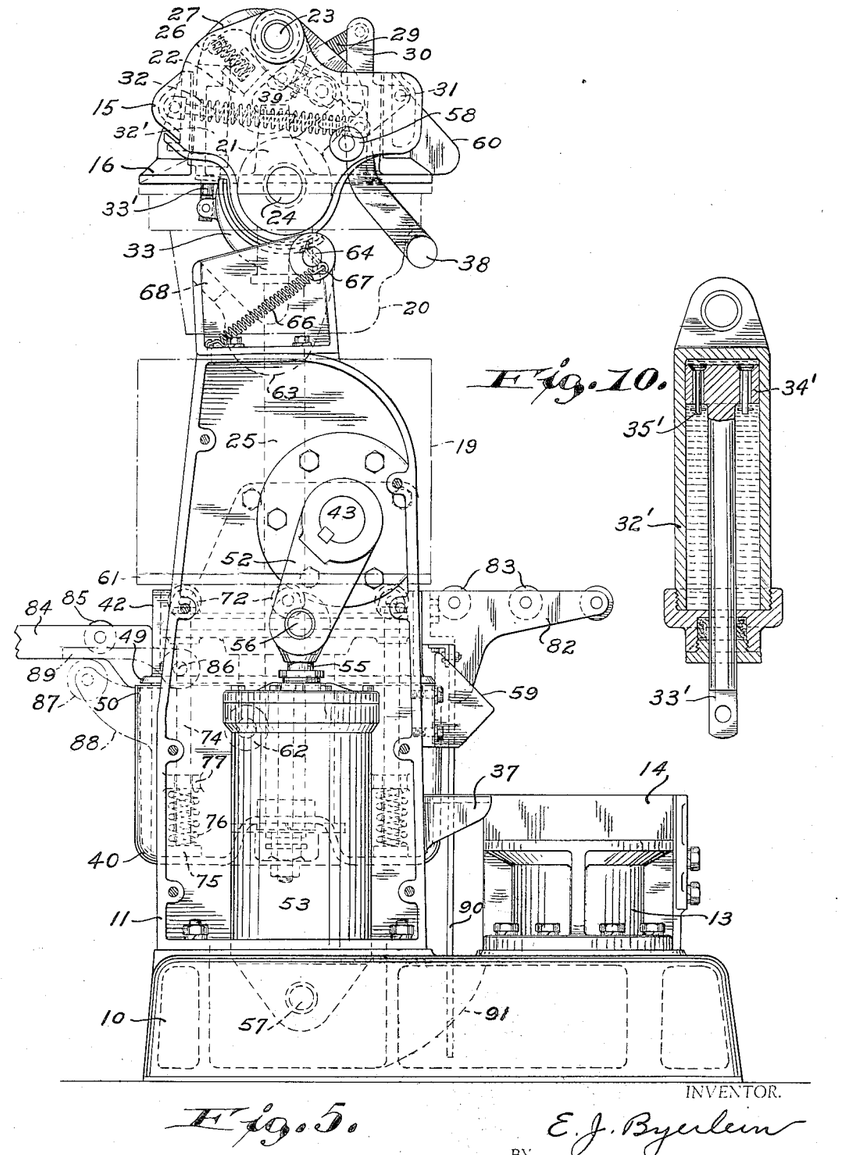
Fig. 5 is an end view of the molding machine showing the pattern withdrawn from the mold so that the final mold is ready for removal from the machine.
Fig. 10 is an enlarged section through the dashpot for cushioning the cradle during tilting thereof.
Figure 6:
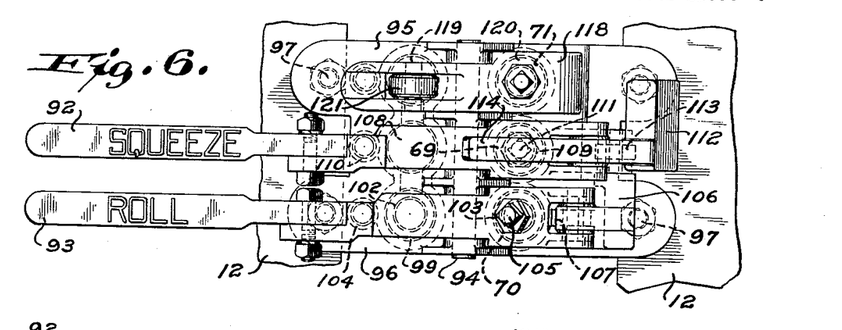
Fig. 6 is an enlarged top view of the squeeze and roll-back control valve mechanisms.

During the inversion operation of the mold, the elements move from the squeezing position shown in Fig. 3 to the position shown in Fig. 4 wherein the flask 19, pattern 20 and squeeze plate 61 are momentarily held clamped between the pattern table 16 and the member 42. The squeeze plate 61 and flask 19 then rest directly upon the member 42 until the pressure upon the plunger 46 is released and fluid under pressure is admitted to the chambers of the draw cylinders between the pistons 47 and the heads 51, through the supply pipe 71. The member 42 is provided with two sets of rolls 72 of which one set is disposed in proximity to each draw cylinder. These rolls 72 are mounted in supports 73 secured to parallel rods 74 which are slidably supported upon the member 42. The ends of the rods 74 remote from the supports 73, are provided with integral heads 75 the outer faces of which are directly engageable with the cross head 40 and the inner faces of which coact with corresponding ends of compression springs 76 embracing the rods 74. The opposite ends of the springs 76 react against lugs 77 formed integral with the member 42, so that when the cross head 40 is moved away from the member 42, the springs 76 become effective to move the supports 73 and rolls 72 into the recesses 78 of the member 42. Upon movement of the cross head 40 toward the member 42, the rolls 72 are pushed partially out of the recesses 78 as shown in Fig. 5, and thus elevate the squeeze plate 61 and flask 19 to provide an anti-friction support which facilitates lateral removal of the finished molds. The springs 76, however, automatically retract the rolls 72 when the cross-head 40 is moved away from the member 42, so that the member 42 is adapted to coact directly with the squeeze plate 61 during the squeezing operation.

After the mold has been completely inverted as shown in Fig. 4, the pattern 20 is automatically withdrawn, as shown in Fig. 5, the pattern table 16 and pattern 20 being simultaneously vibrated during the drawing operation by the admission of fluid under pressure to a vibrator cylinder 79 shown in Fig. 1. The vibrator cylinder 79 is secured to the pattern support 16 and is supplied with actuating fluid through a pipe 80 which communicates with a valve 81 mounted on the end frame 12. The valve 81 may be of any desired construction, and is automatically operable to actuate the vibrator, by means of a stem 81' which is engaged by the end face of the cross head flange 50 during the inversion of the molds. As the cross head 40 moves upwardly from its initially inverted position shown in Fig. 4, to pattern drawn position illustrated in Fig. 5, the valve stem 81' is automatically disengaged and the operation of the vibrator cylinder 79 ceases. The drawing of the pattern 20 is obviously effected by the admission of fluid under pressure through the pipe 71 to the space between the pistons 47 and cylinder heads 51, and due to the provision of two pistons which must travel along paths which are parallel to each other and to the guide rods 25, the draw motion will always be such as to produce perfect release of the patterns from the molds.

When the drawing operation has been completed and the elements are positioned as shown in Fig. 5, the finished mold is resting upon the rollers 72 and may be withdrawn laterally from beneath the elevated pattern 20 in either direction. In order to facilitate removal of the molds in one direction, the member 42 may be provided with fixed brackets 82 having rollers 83 mounted therein. The bearing surfaces of the rollers 83 are preferably disposed in the plane of the bearing surfaces of the rollers 72 when the latter have been pushed out of the recesses 78 by the cross head 40. Such disposition of the rollers 83 will permit the molds to be pulled laterally from beneath the raised pattern 20, with little effort, and subsequently freely removed either by hand or with a crane. In order to facilitate removal of the finished molds in the opposite direction, the member 42 may also be provided with swingable conveyor bars 84 having rollers 85 supported therebetween and mounted upon a pivot 86. The conveyor bars 84 may be swung into horizontal position as illustrated in Figs. 4 and 5, either manually or automatically when the molds are inverted preparatory to withdrawal of the pattern 20. An automatically functioning device for thus swinging the bars 84 into horizontal position, is shown diagrammatically in Figs. 4 and 5, and comprises rollers 87 mounted upon brackets 38 secured to the end frames 11, 12, and arms 89 secured to the pivot 86. As the member 42 which carries the pivot 86 is revolved about the axis of the shafts 43, 44, the arms 89 will strike the rollers 87 and will cause the bars 84 to swing away from the member 42 into horizontal position. The finished molds may then be removed laterally from beneath the raised pattern 20 and from the rollers 72, upon the rollers 87, with minimum effort, and they may thereafter be removed from the rollers 87 as desired. When the elements are subsequently rolled over preparatory to the formation of a subsequent mold, the bars 84 will automatically swing back to the position shown in Figs. 2 and 3 wherein they are out of the way and do not interfere with the mold forming operations. It will thus be apparent that the molds may be withdrawn laterally from beneath the cradle 15 and pattern 20 in either direction and with minimum effort, thus enhancing to a maximum the speed of production.

The revolving member 42 may also be provided with means for automatically preventing undesirable accumulation of drop sand upon the base plate 10 and between the end frames 11, 12. As shown in Fig. 5, this sand removal means comprises a sweeper plate 90 secured to the member 42 and cooperating with a fixed splitter or plow share 91 formed on the base plate 10 adjacent to the lower end of the jolting cylinder 13. During the introduction of sand to the flask and pattern, some of the sand may drop upon the base plate 10 between the end frames 11, 12, and this drop sand is swept forwardly to a position on opposite sides of the cylinder 13 where it may be conveniently removed, by the plate 90 cooperating with the plow share 91, as will be clearly apparent from Fig. 4.

Upon final removal of the completed molds, the mechanism may be again restored from the position illustrated in Fig. 5 to the position shown in Fig. 2, by actuating the roll-back valve mechanism to admit fluid under pressure to the cylinder 53 through the pipe 70. As the piston 54 is elevated, the crank 52 swings the member 42 and the elements supported thereby, in a clockwise direction as viewed in Figs. 5 and 2 until the roller 62 strikes the lower portion of the nose of the hook 63 and swings this hook back against the tension of the spring 66. The roller 62 after passing beneath the lug 68, permits the hook 63 to swing back into engagement with the lug 68 and subsequently rides into the hook socket as the cradle 15 swings into horizontal position shown in Fig. 2. The levers 38 are also automatically actuated to release the locking hooks 22 when this roll-back operation takes place. The laterally extending end projections at the swinging ends of the levers 38, strike and ride upwardly along the upper inclined surfaces of the brackets 59, thus disengaging the coaction between the levers 36 and the projections 34 and permitting the springs 32 to withdraw the hooks 22 from the lugs 21.

As previously described, the jolting cylinder is supplied with fluid under pressure through a pipe 17 communicating with a source of supply past a manually controlled valve 18, and the vibrator cylinder 79 is supplied with fluid under pressure through a pipe 80 communicating with the source of supply past the automatically actuated valve 81. The valves 18, 81 are of well-known construction and need not be described in detail. The squeeze and roll over valve mechanisms which control the delivery of fluid to and the exhaust of fluid from the plunger 46 and pistons 47, 54 through the pipes 69, 71, 70 respectively, are however of special construction as shown in Figs. 1, 6, 7, 8 and 9. These valve mechanisms may be housed within the end frame 12 directly beneath the end of the pivot shaft 44 and comprise a squeeze control lever 92 and a roll-back control lever 93 both mounted to swing upon a common pivot 94 supported upon adjoining valve casings 95, 96 secured to flanges of the frame 12 by means of set screws 97. The casings 95, 96 have a common fluid supply port 98 which communicates with the source of fluid supply through a pipe 99, and are provided with segregated intermediate chambers 100 and with fluid exhaust ports 101.

Figures 7, 8, 9:
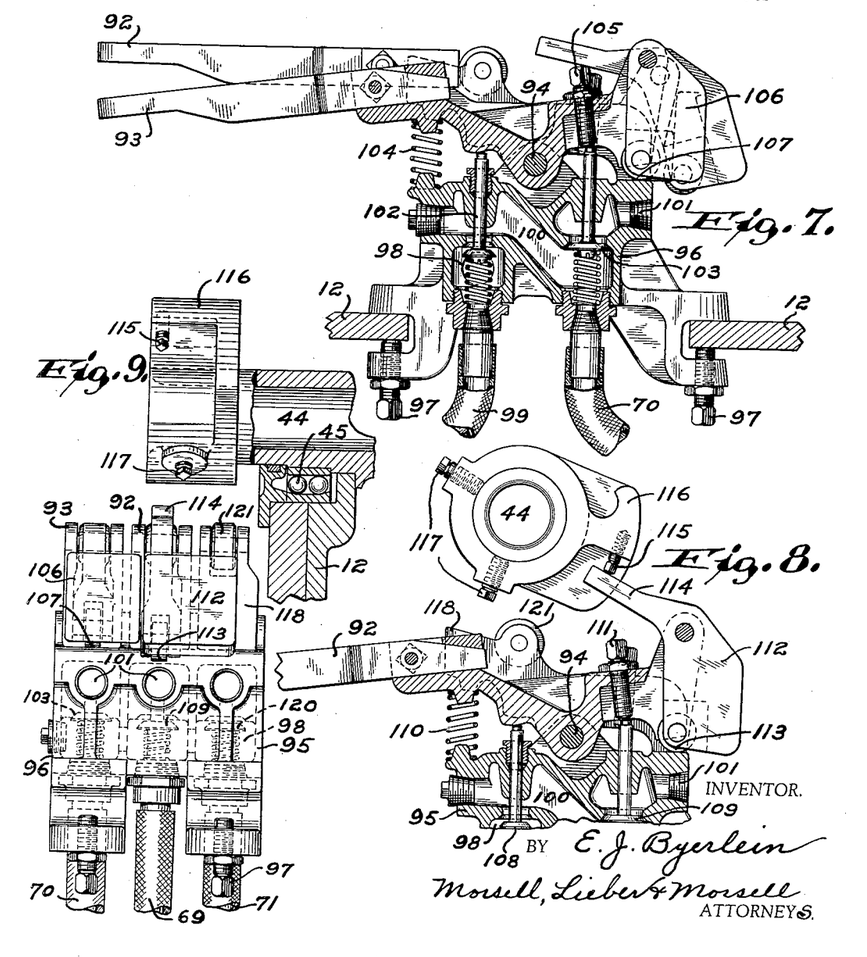
Fig. 7 is a part sectional side view of a portion of the roll-back control valve and actuating mechanisms.
Fig. 8 is a fragmentary part sectional side view of a portion of the squeeze control valve and actuating mechanisms.
Fig. 9 is a part sectional end view of the improved squeeze and roll-back control valves and actuating mechanisms.

The roll-back lever 93 controls the operation of a spring pressed valve 102 for admitting fluid under pressure from the supply pipe 99 to the cylinder 53 through the pipe 70, and also controls the operation of a spring pressed exhaust valve 103 for effecting discharge of fluid from the cylinder 53 and pipe 70 to the exhaust port 101 of the casing 96 as clearly shown in Fig. 7. The roll-back lever 93 is constantly urged toward horizontal position by means of a spring 104, and a set screw 105 provides for relative adjustment between this lever and the valve 103 so as to insure proper seating of both valves 102, 103. A latch 106 pivotally suspended from an end of the lever 93 has a roller 107 which is engageable with an upper surface of the casing 96 to lock the inlet valve 102 and lever 93 in the position shown in Fig. 7 with the valve 102 open and the exhaust valve 103 closed. The latch 106 is movable into locking position by gravity, and is automatically released to permit return of the lever 93 to horizontal position by the spring 104, when the squeeze lever 92 is operated.

The squeeze lever 92 controls the operation of a spring pressed valve 108 for admitting fluid under pressure from the supply pipe 99 to the plunger 46 through the pipe 69, and also controls the operation of a spring pressed exhaust valve 109 as shown in Fig. 8. The squeeze lever 92 is constantly urged toward horizontal position by means of a spring 110, and a set screw 111 provides for relative adjustment between this lever and the valve 109 so as to insure proper seating of the valves 108, 109. A latch lever 112 is pivotally suspended from an end of the squeeze lever 92 and has a roller 113 which is engageable with an upper surface of the casing 95 to lock the supply valve 108 and lever 92 in the position shown in Fig. 8 with the valve 108 open and the exhaust valve 109 closed. The latch lever 112 is movable into locking position by gravity, and the squeeze lever 92 is formed to engage the latch 106 of the roll-back lever 93 and to release the same, when the squeeze lever 92 is actuated. The latch lever 112 is provided with an integral arm 114 which is engageable by a set screw 115 carried by a cam 116 secured to the pivot shaft 44, when the squeezing operation has been completed and inversion of the mold begins, and the cam 116 is adjustably attached to the shaft 44 by means of set screws 117.

Located laterally adjacent to the squeeze lever 92 and in the path of movement of the rotary cam 116, is an automatically actuated draw valve actuating lever 118 which is adapted to operate inlet and exhaust valves 119, 120 for admitting and exhausting fluid under pressure to and from the draw cylinders and pistons 47 through the pipe 71. The valves 119, 120 are identical with the squeeze control valves 108, 109 respectively, and the lever 118 is normally held in inactive position by means of a spring similar to the spring 110. A roller 121 carried by the lever 118 is directly engageable with the cam 116 when the complete inversion of the mold has been effected and after the squeezing operation has been completed. The lever 118 will therefore be maintained in effective position to admit fluid under pressure to the pistons 47, until the roll-back lever 93 is manipulated to return the mechanism to the position shown in Fig. 2.

Although the detailed operation of the improved molding machine should be clearly apparent from the foregoing description of the mechanisms, the general mode of operation will again be reviewed. To place the machine elements in the position shown in Figs. 1 and 2, it is only necessary to operate the roll-back lever 93 thereby admitting fluid under pressure from the supply pipe 99 to the chamber beneath the piston 54 past the valve 102 and through the pipe 70. As the mechanism approaches the position indicated in Fig. 2, the cam 116 is automatically disengaged from the roller 121 and the lever 118 is moved upwardly to close the inlet valve 119 and to open the exhaust valve 120 for the draw pistons 47, and these pistons are thus relieved from fluid pressure preparatory to subsequent sand squeezing. The roll-back movement also causes the roller 62 to assume a position within the hook 63, and the levers 38 engage the inclined surfaces of the brackets 59 to release the locking hooks 22. The flanges 60 also function during the final portion of the roll-back movement, to tilt the carriage 15 into horizontal position upon the supporting brackets 37.

After the machine has been placed in sand receiving position, and the pattern 20 has been properly attached to the pattern table 16, a flask 19 may be applied to guide pins on the pattern, whereupon the sand may be thrown into the flask 19 and upon the pattern 20. The pattern table 16 and the elements supported thereby, may then be jolted by manually actuating the jolt control valve 18 which controls the operation of the jolt plunger 14. When the flask 19 has been thus supplied with sand and the sand has been sufficiently jolted to eliminate air pockets, the squeeze plate 61 may be applied preparatory to tilting of the cradle 15 and subsequent squeezing of the sand.

The squeeze lever 92 may then be pressed downwardly to open the inlet valve 108 and to close the exhaust valve 109. Fluid under pressure is then admitted from the supply pipe 99 past the valve 108 and through the pipe 69 to the squeeze plunger 46, causing this plunger to rise and to move the cradle 15 and the coacting elements into the tilted position shown in Fig. 3. In this position, the pattern table 16 is locked to the cradle 15 by the hooks 22 which engage the projections 21, and the squeezing movement of the cradle 15 toward the member continues until the sand in the mold is completely compressed. As the squeezing operation proceeds, the rollers 58 ride along the inclined surfaces of the guide brackets 59, and the roller 62 rides along and over the guide 68, whereupon the weight of elements carried by the member 42 will cause the structure supported upon the pivot shafts 43, 44 to revolve in a counter-clockwise direction as viewed in Fig. 3 toward the position shown in Fig. 4. Such revolution of the member 42 and consequent inversion of the mold is permitted by the piston 54, since the roll-back lever 93 is automatically returned to exhaust position when the squeeze lever 92 is operated, thus releasing the pressure beneath the piston 54.

Upon approaching the inverted position shown in Fig. 4, the vibrator cylinder 79 is actuated by the engagement of the valve stem 81' with the cross-head flange 50, and the set screw 115 on the cam 116 automatically returns the squeeze control lever 92 to exhaust position while the cam 116 itself actuates the draw lever 118. Fluid under pressure is then admitted to the pattern drawing chambers betwen the pistons 47 and the heads 51, through the pipes 71, causing the vibrating pattern 20 to be withdrawn from within the flask 19 to the position shown in Fig. 5. The vibration of the pattern 20 ceases as the cross-head flange 50 leaves the valve actuating stem 81', and the draw pressure is maintained against the pistons 47 until subseqent roll-back operation is effected in order to prevent the pattern 20 from lowering before the mold is removed. After the completed mold has been withdrawn, the machine is ready for repetition of the cycle, and formation of subsequent molds.

The rollers 72 automatically elevate the finished mold as the drawing operation proceeds, and the rollers 83, 85 permit withdrawal of the finished molds from beneath the pattern 20, in either direction. The sweeper plate 90 cooperating with the plow share 91 prevents undesirable accumulation of drop sand upon the base plate 10, and thus avoids interference with the cross-head 40 during inversion of the molds.

From the foregoing description, it will be apparent that the present invention provides a simple and highly efficient method of producing successive molds at a rapid rate of speed with the expenditure of minimum power. The machine for carrying on the commercial exploitation of the improved method is relatively simple and compact in construction and can be operated by unskilled labor to produce successive perfect molds of relatively large dimensions and of complex structure, far more rapidly than has heretofore been possible with other machines. The successive steps of jolting, squeezing, inverting and drawing, are accomplished in perfect sequence and without loss of time and effort, and the mechanism is quickly restored to position preparatory to the formation of the subsequent molds. While the operations of jolting, squeezing and rolling-back are under manual control, the operations of inverting, drawing and vibrating the pattern are all automatic. The machine is moreover provided with various appliances for insuring safe operation and for facilitating removal of the finished molds, and eliminates necessity of undesirably handling the molds during formation thereof, and also dispenses with the use of special clamps for holding the patterns and flasks in proper coaction with each other. While some of the structural elements have been shown more or less diagrammatically, this has been done merely in order to simplify and clarify the disclosure, and it may be stated that the improvement has proven highly satisfactory in commercial operation.

It should be understood that it is not desired to limit the invention to the precise steps of the method or to the exact details of construction herein shown and described, for various modifications within the scope of the appended claims may occur to persons skilled in the art.

It is claimed and desired to secure by Letters Patent:

1. The method of forming a mold, which comprises, packing mold forming material against a pattern supported from beneath, tilting the pattern with the initially packed material, squeezing the material after said tilting to complete the mold and completely inverting the assemblage, and drawing the pattern away from the inverted mold.

2. The method of forming a mold, which comprises, packing sand against a pattern supported from beneath, tilting the pattern with the initially packed sand, simultaneously squeezing the sand after said tilting to complete the mold and completely inverting the assemblage, and drawing the pattern upwardly away from the inverted mold.

3. The method of forming a mold, which comprises, placing sand against a pattern supported from beneath, jolting the pattern to initially pack the sand in contact with the pattern surfaces, tilting the pattern with the initially packed sand, squeezing the sand after said tilting to complete the mold and completely inverting the assemblage, and drawing the pattern upwardly away from the inverted mold.

4. In a molding machine, means for supporting a pattern for the reception of sand from above and for the initial jolting thereof, means for tilting the assemblage and for applying direct pressure to the sand to form a complete mold and for inverting the completed mold, and means for stripping the pattern from the inverted mold.

5. In a molding machine, jolting mechanism for supporting a pattern for the downward reception of sand, means for tilting the pattern after completion of the jolting operation and for squeezing the sand while the pattern is tilted to complete the mold, and means for finally withdrawing the pattern from the mold.

6. In a molding machine, jolting mechanism for supporting a pattern for the downward reception of sand, means for tilting the pattern after completion of the jolting operation and for squeezing the sand while the pattern is tilted to complete the mold and for inverting the completed mold, and means for finally withdrawing the pattern upwardly from the mold.

7. In a molding machine, jolting mechanism for supporting a pattern for the downward reception of sand, means for tilting the pattern after completion of the jolting operation and for squeezing the sand while the pattern is tilted to complete the mold, means for positively retaining said pattern in tilted position, and means for finally withdrawing the pattern from the mold.

8. In a molding machine, jolting mechanism for supporting a pattern for the downward reception of sand, means for tilting the pattern after completion of the jolting operation and for squeezing the sand while the pattern is tilted to complete the mold and for inverting the completed mold, means for positively retaining said pattern in tilted position prior to squeezing of the sand, and means for finally withdrawing the pattern from the mold.

9. In a molding machine, means for supporting a pattern for the reception of sand from above, means for tilting the assemblage and for applying direct pressure to the sand to form a completed mold and for inverting the completed mold, and means for stripping the pattern from the inverted mold.

10. In a molding machine, means for supporting a pattern for the reception of sand from above, means for tilting the assemblage and for applying direct pressure to the sand to form a completed mold and for inverting the completed mold, and means for stripping the pattern from the inverted mold and for simultaneously elevating the completed mold.

11. In a molding machine, a cradle for supporting a pattern for the downward reception of sand, mechanism for jolting the pattern while in sand receiving position, means for tilting said cradle and for positively squeezing the sand against the pattern while said cradle is tilted and for inverting the pattern after said squeezing of the sand, and means for finally withdrawing the pattern from the completed and inverted mold.

12. In a molding machine, a cradle, a pattern support movably associated with said cradle while in sand receiving position, jolting mechanism operatively cooperable with said support while in sand receiving position, means for locking said support to said cradle, means for positively retaining said support and cradle in tilted position, means for squeezing the sand while said cradle is tilted and for subsequently inverting said cradle and the elements carried thereby and for supporting the pattern with said support in inverted position, and means for withdrawing said cradle together with said support and pattern after said inversion.

13. In a molding machine, a cradle, a pattern supporting table movably supported by said cradle while in sand receiving position, mechanism for jolting said table while in sand receiving position, means for locking said table to said cradle, means for subsequently positively retaining said cradle and table in tilted position, means for squeezing the sand against the pattern while said cradle and table are tilted and for completely inverting the mold produced by said sand squeezing operation, means for supporting the inverted mold, and means for withdrawing the pattern from the inverted mold.

14. In a molding machine, a member revolvable about an axis, a cradle movable toward and away from said member and revolvable therewith, said cradle being independently swingable about another axis, means for positioning said cradle out of alinement with said member during delivery of sand to a pattern supported by said cradle, means for subsequently swinging said cradle and pattern into alinement with said member and for squeezing the sand against said pattern when said cradle and member are in alined position, means for revolving said member and cradle to invert said pattern after said squeezing operation, and means for moving said cradle and the pattern away from said member after said inversion.

15. In a molding machine, a member revolvable about a horizontal axis, a cradle carried by said member and independently swingable about another horizontal axis, means for holding said cradle with its pattern supporting surface horizontal while being supplied with sand, means for subsequently swinging said cradle to bring the pattern into alinement with said member and for moving said cradle toward said member to squeeze the sand against said pattern, means for simultaneously revolving said member and cradle to invert the pattern, and means for moving said cradle and the pattern away from said member.

16. In a molding machine, a member revolvable about a fixed axis, a cradle spaced from said member and swingable about said fixed and a movable axis, means for holding said cradle out of the plane of said axes while a pattern resting thereon is being supplied with sand, means for swinging said cradle about said movable axis to bring the sand packed pattern into alignment with said plane and for relatively moving said cradle and member toward each other to squeeze the sand against the pattern, means for revolving said member and cradle about said fixed axis after the sand squeezing operation, and means for finally relatively moving said cradle and member away from each other to leave the completed mold resting upon said member.

17. In a molding machine, a member revolvable about a fixed axis, a cradle movable toward and away from said member, said cradle being revolvable with said member about said axis and also being tiltable about a second axis disposed parallel to said fixed axis, means for positioning said cradle in a horizontal position while a pattern resting thereon is being supplied with sand, means for subsequently tilting and moving said cradle toward said member while the latter is stationary, and means for simultaneously revolving said member and cradle to invert the same.

18. In a molding machine, a member revolvable about a fixed horizontal axis, a cradle movable toward and away from said member, said cradle being revolvable with said member about said fixed axis and also being tiltable about another axis which is revolvable about said fixed axis, means for positioning said cradle out of the vertical plane of said fixed axis while sand is being supplied to a pattern resting upon said cradle, means for subsequently tilting and moving said cradle toward said member, and means for simultaneously revolving said member and cradle about said fixed axis.

19. In a molding machine, a member revolvable about a fixed axis, a cradle movable toward said member and tiltable about a movable axis, means for holding said cradle in horizontal position while sand is being supplied to a patern resting upon said cradle, means for tilting and moving said cradle toward said member while the latter is stationary, means for simultaneously revolving said member and cradle about said fixed axis, and means for moving said cradle away from said member while the latter is again stationary.

20. In a molding machine, a member revolvable about an axis, a cradle movable toward and away from said member and tiltable relative to said member, means for holding said cradle in a predetermined position while sand is being supplied to a pattern disposed above said cradle, means for tilting and moving said cradle toward said member, means for simultaneously revolving said cradle and member about said axis, and means for moving said cradle away from said member.

21. In a molding machine, a member revolvable about an axis, a cradle suspended from and tiltable relative to said member, means for holding said cradle in a predetermined position while sand is being jolted against a pattern associated with said cradle, means for tilting and moving said cradle toward said member to squeeze the sand, and means for revolving both said cradle and member about said axis to facilitate removal of the pattern from the mold.

22. In a molding machine, a member revolvable about an axis, a cradle suspended from and tiltable relative to said member, means for retaining said cradle in a definite position while sand is being jolted aganst a pattern associated with said cradle, means for tilting said cradle and for moving the same toward said member to squeeze the sand, and means for subsequently revolving said cradle and member about said axis to invert the pattern and leave the mold resting upon said member.

23. In a molding machine, a member revolvable about a fixed horizontal axis, a cradle supported by and tiltable relative to said member, means for maintaining said cradle in a definite fixed position while sand is being delivered to a pattern associated with said cradle, means for tilting said cradle and for subsequently moving the same toward said member to squeeze the sand, means for revolving said cradle and member about said axis to leave the mold resting upon said member, and means for finally moving said cradle away from said member and the mold.

24. In a molding machine, a member movable about a fixed axis, a cradle tiltable relative to said member, means for maintaining said cradle at an angle relative to said member while sand is being supplied to a pattern associated with said cradle, fluid pressure actuated means for tilting said cradle into alinement with and for moving the same toward said member after tilting, means for moving said cradle and member about said axis to leave the mold resting upon said member, and fluid pressure actuated means for moving said cradle away from said member to draw the pattern from the mold.

25. In a molding machine, a pattern and flask support, means for holding said support to permit downward delivery of sand to a pattern and flask resting upon said support, means for subsequently tilting and moving said support to squeeze the sand, means for inverting the pattern and flask and for moving said support to draw the pattern, and means cooperable with said inverting means to restore said support to sand receiving position.

26. In a molding machine, a pattern and flask support, means for holding said support to permit downward delivery of sand to a pattern and flask while disposed above said support, manually operable control means for successively tilting said support and moving said support while tilted to squeeze the sand and inverting said support, automatically operable control means for moving said support while inverted to draw the pattern from the mold, and means for rolling said support back to initial sand receiving position.

27. In a molding machine, a pattern table having lugs, a cradle slidably supporting said table, hooks carried by said cradle and cooperable with said lugs to lock said table to said cradle, and means for tilting said cradle to effect said locking engagement.

28. In a molding machine, a pattern table having lugs, a cradle movably supporting said table, hook means carried by said cradle and engageable with said lugs to lock said table to said cradle, means for tilting said cradle to effect said locking engagement and for moving said cradle and table while locked together, and means for guiding said cradle during said movement.

29. In a molding machine, means for supporting a pattern for the reception of sand from above, means for tilting the pattern and for applying direct pressure to the sand to form a mold, means for inverting the mold, and means cooperable with said pressure applying means to strip the pattern from the inverted mold.

30. In a molding machine, jolting mechanism for supporting a pattern for the downward reception of sand, means for tilting the pattern after completion of the jolting operation and for squeezing the sand while the pattern is tilted to complete the mold, means for inverting the mold, and means cooperable with said squeezing means for stripping the pattern from the inverted mold.

31. In a molding machine, jolting mechanism for supporting a pattern for the downward reception of sand, means for tilting the pattern after completion of the jolting operation and for squeezing the sand while the pattern is tilted to complete the mold, means for cushioning the pattern during tilting to prevent spilling of sand, means for inverting the mold, and means cooperable with said squeezing means for stripping the pattern from the inverted mold.

32. In a molding machine, means for supporting a pattern and for initially packing sand thereagainst, means for tilting the pattern after said initial packing and for squeezing the sand while the pattern is tilted to complete the mold, means for positively retaining the pattern in tilted position during said squeezing, means for inverting the mold, and means for stripping the pattern from the inverted mold.

33. In a molding machine, means for supporting a pattern and for initially packing sand thereagainst, means for tilting the pattern after said initial packing and for squeezing the sand while the pattern is tilted to complete the mold, means for cushioning the pattern during tilting, means for positively retaining the pattern in tilted position during said squeezing, means for inverting the mold, and means for stripping the pattern from the inverted mold.

ERLE J. BYERLEIN.